(12) United States Patent  
Colligan

(10) Patent No.: US 6,516,992 B1  
(45) Date of Patent: Feb. 11, 2003

(54) FRICTION STIR WELDING WITH SIMULTANEOUS COOLING

(75) Inventor: Kevin James Colligan, North Bend, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 08/655,926

(22) Filed: May 31, 1996

(51) Int. Cl.$^7$ ................................................ B23K 20/12
(52) U.S. Cl. ...................... 228/112.1; 228/114; 228/222
(58) Field of Search ............................. 228/112.1, 114, 228/114.5, 214, 222, 50; 156/73.5, 580

(56) References Cited

U.S. PATENT DOCUMENTS

| | | | | |
|---|---|---|---|---|
| 3,212,182 A | * | 10/1965 | Hollander | 228/114 |
| 3,234,643 A | * | 2/1966 | Hollander | 228/114 |
| 4,103,138 A | | 7/1978 | Moriki | |
| 5,138,766 A | * | 8/1992 | Kimura et al. | 29/895.21 |
| 5,240,167 A | * | 8/1993 | Ferte et al. | 228/114.5 |
| 5,460,317 A | | 10/1995 | Thomas et al. | |

FOREIGN PATENT DOCUMENTS

| WO | WO 93/10935 | 6/1993 |
|---|---|---|
| WO | WO 95/26254 | 10/1995 |

OTHER PUBLICATIONS

Abstracts and Exemplary Claims of U.S. Patents, pp. 6–14, for: Patent No. 5,469,617; Patent No. 5,460,317, Patent No. 5,262,123, Patent No. 4,811,887, Patent No. 4,605,151, Patent No. 3,460,235, Patent No. 5,170,031, Patent No. 4,959,241.

* cited by examiner

Primary Examiner—Samuel M. Heinrich  
(74) Attorney, Agent, or Firm—Christensen O'Connor Johnson Kindness PPLC

(57) ABSTRACT

A method and apparatus for friction stir welding that produces a weld of significantly reduced surface roughness at significantly higher welding rates, in materials that are difficult to weld, such as non-extrudable aluminum alloys. The method includes cooling the stir welding tool during the welding process, thereby reducing the tendency of softened metal to adhere to the rotating pin and shoulder of the tool. The apparatus includes a tool with internal spaces or an external jacket, through which coolant can be pumped to remove heat and cool the tool during welding operations. In another embodiment, the apparatus includes a device for spraying a coolant onto exterior surfaces of the distal end of the welding tool to thereby remove heat from the tool, and the surrounding workpiece, during welding.

12 Claims, 6 Drawing Sheets

FRICTION STIR WELDING WITH SIMULTANEOUS COOLING

FIELD OF THE INVENTION

The invention relates to a method and apparatus for friction stir welding. More particularly, in accordance with the invention, excess heat produced in the friction stir welding process is removed so that a smoother weld surface is produced.

BACKGROUND OF THE INVENTION

Friction stir welding (FSW) is a relatively new welding process for joining together parts of materials such as metals, plastics, and other materials that will soften and commingle under applied frictional heat to become integrally connected. A detailed description of the FSW apparatus and process may be found in Patent Publications WO 93/10935; WO 95/26254; and U.S. Pat. No. 5,460,317, all of which are hereby fully incorporated by reference. One of the useful apparatus for FSW is shown in FIGS. 1A and 1B. As shown, two parts, exemplified by plates 10A', and 10B' are aligned so that edges of the plates to be welded together are held in direct contact on a backing plate 12'. An FSW tool W has a shoulder 14' at its distal end, and a non-consumable welding pin 16' extending downwards centrally from the shoulder. As the rotating tool W' is brought into contact with the interface between plates 10B' and 10A', the rotating pin 16' is forced into contact with the material of both plates, as shown. The rotation of the pin in the material and rubbing of the shoulder against the upper surface of the material produces a large amount of frictional heating of both the welding tool and the plate interface. This heat softens the material of the plates in the vicinity of the rotating pin and shoulder, causing commingling of material, which upon hardening, forms a weld. The tool is moved longitudinally along the interface between plates 10A' and 10B', thereby forming an elongate weld all along the interface between the plates. The welding tool's shoulder 14' prevents softened material from the plates from escaping upwards, and forces the material into the weld joint. When the weld is completed, the welding tool is retracted.

Welds produced by the prior art friction stir welding process can produce smooth welds for certain materials, but for non-extrudable aluminum alloys, the maximum spindle speed is severely limited by adherence of the material to the welding tool shoulder and pin. For these alloys, exemplified by aluminum alloys 7075, 2014, 2090, and 2024, as the spindle speed increases, and correspondingly the heat input to the weld increases, the surface texture of the upper surface of the weld degrades by becoming rougher. At higher spindle speeds, and higher heat input, the aluminum material adheres and builds up on the welding tool shoulder, tearing away material from the sides of the weld surface. For long welds, this condition can cause such excessive buildup that continuing the weld becomes impossible. Also, the overheated welding tool can sometimes partially tear away surface material from the center of the weld surface, producing a "fish scale" appearance on the upper surface of the weld which progressively worsens along the length of the weld. For certain applications such a rough weld surface is undesirable, and requires additional machining to produce a smooth surface. Rough surfaces often provide points of initiation of fatigue cracks, and are therefore generally undesirable, especially if the welded part is to be used under conditions that could cause fatigue, such as cyclical conditions of applied load. There exists a need for a FSW process that produces a weld of reduced surface roughness that would not require subsequent machining, for most applications, and that would have a uniform, smooth surface texture.

SUMMARY OF THE INVENTION

The invention provides a method and apparatus for producing a friction stir weld of difficult to weld materials, such as non-extrudable aluminum alloys, that has a smoother surface than heretofore achieved with conventional friction stir welding equipment. The weld is produced at higher speeds and has a commercially acceptable surface smoothness so that it does not require subsequent machining for most purposes.

In accordance with the invention, it has now been found that the rate of welding limitation on non-extrudable materials, imposed by the increasing roughness of the weld surface as welding rate increases, is caused by excessive heat generated during the friction stir welding process at the surfaces of contact between the tool and the workpiece being welded. While a certain amount of heat is necessary to cause softening of the material to form the weld, excessive heat causes the softened material to adhere to the rotating pin and shoulder of the friction stir welding tool. The rotational and lateral movement of the tool against these adhesive-type forces causes the irregular weld surface. Therefore, the invention provides a method of friction stir welding that includes the step of simultaneously cooling the welding tool during the welding process to remove excess heat. This method allows a significant increase in welding rate, preferably at least about a 20% increase, and more preferably at least about a 100% increase, while maintaining an acceptable weld smoothness. Moreover, the invention provides apparatus for friction stir welding that are cooled by a coolant.

In one embodiment the coolant is circulated in the body of the tool to remove excess heat. In this embodiment, the friction stir welding tool of the invention has a tool body with a rotatable, usually non-consumable, pin and shoulder at its distal end that are adapted for stir welding parts together. The tool body has an internal space that is in heat-conducting communication with the pin, and preferably also the shoulder, of the welding tool. The internal space is adapted for flowing a coolant therethrough to remove excess heat from the tool, including heat conducted from the shoulder and pin.

In another embodiment, heat is removed from the friction stir welding tool by a jacket that surrounds a distal portion of the tool body. The jacket has an inlet that is in fluid communication with a source of coolant, and an outlet for exit of heated coolant. Thus, when the tool is in use, coolant flows through the jacket removing heat from the tool, so that excess heat is removed from the rotatable pin and shoulder.

In another embodiment, the removal of heat is achieved by spraying a coolant (such as cold air, or a liquid coolant, such as water) onto the tool, and surrounding surfaces being welded, during the welding step. Preferably, the tool portion being cooled is equipped with fins to facilitate heat removal.

In accordance with the invention, friction stir welds of even non-extrudable aluminum alloys are produced at commercially useful rates and have such a reduced surface roughness texture that they may be used commercially.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1A:
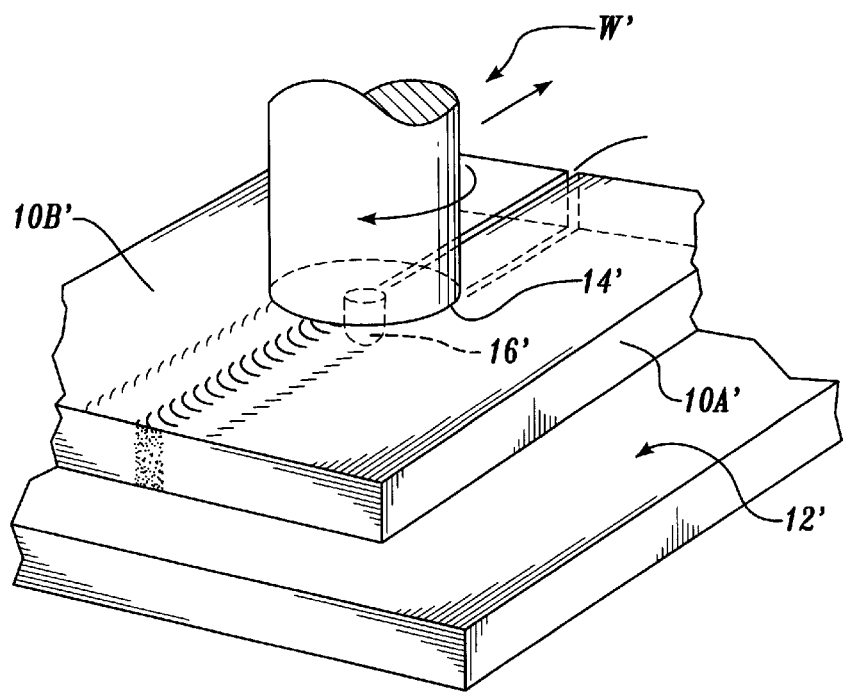
FIG. 1A is a schematic diagram of a prior art friction stir welding tool.
Figure 1B:
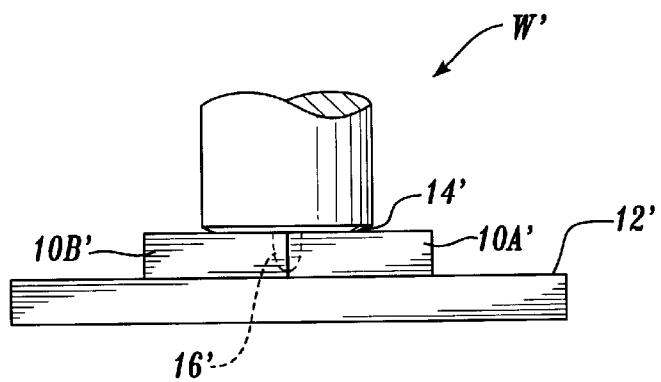
FIG. 1B is a schematic end view showing a prior art friction stir welding tool in use.

In accordance with the invention, excess heat is removed from a friction stir welding tool (FSW) to reduce the degree of adherence between the tool and softened, difficult to weld material, such as non-extrudable aluminum alloys, so that a weld with a smoother surface is produced at a faster rate. Such smooth surface welds have many potential advantages, not only aesthetic, but also in reducing the risk of the initiation of fatigue cracking and corrosion. Moreover, the production of such welds eliminates, or reduces, the need for costly further machining of the weld to produce a smooth surface. The invention also increases welding rate by allowing higher FSW tool rotational speeds.

In accordance with the method of the invention, excess heat is removed from the friction stir welding tool while the friction stir weld is being formed. Thus, the heat removal is simultaneous with the welding operation. While the method and apparatus of the invention are applicable to all kinds of material that are subject to friction stir welding, the invention is particularly useful when applied to materials that are difficult to friction stir weld, such as the non-extrudable aluminum alloys, exemplified by the 2024, 7075, 2014, and 2090 alloys. In the prior art, these alloys are typically welded at a much slower rate than the extrudable aluminum alloys, in order to produce a weld that extends throughout the workpiece, and that has a surface smoothness that is commercially acceptable, without need for subsequent machining. Thus, while a one-quarter inch thick extrudable aluminum alloy, such as alloy 6061, may be welded with a friction stir welding tool rotating at 1600 rpm, at a rate of 15 inches per minute, to produce a smooth weld; a non-extrudable alloy would have to be welded at a lower tool rotation rate and slower rate of welding. Typically, in the prior art, a one-eighth inch thick non-extrudable alloy, such as alloy 2024, may be welded at a tool rotation speed of about 500 rpm for a weld rate of 3.5 inches per minute. This produces a weld throughout the workpiece, that has a surface of acceptable smoothness, without need for subsequent machining. In accordance with the invention, the same one-eighth inch thick workpiece of 2024 alloy can be welded at a tool rotation speed of at least about 800 rpm to produce a weld at a rate of about eight inches per minute, that extends throughout the workpiece and that has a commercially acceptable smooth surface. Similarly, a one-eighth inch thick workpiece of 7075 aluminum alloy (a non-extrudable alloy), can be welded with a tool rotating at 1100 rpm, and a welding rate of 13 inches per minute to produce a weld that extends throughout the workpiece, with a surface of acceptable smoothness without subsequent machining. In the prior art, not using the tools and method of the invention, the same 7075 alloy workpiece would have been welded with a tool rotating at 600 rpm and producing a weld at a rate of only seven inches per minute.

From the foregoing, it is clear that the invention allows a significant increase in the rate of rotation of the friction stir welding tool, with a concomitant dramatic increase in the rate of welding, in inches per minute. Preferably, the invention allows an increase in welding rate of at least about 20%, most preferably at least about 100%, while maintaining a weld surface smoothness that is usually commercially acceptable, without requiring subsequent machining, although such machining may optionally be performed for specific applications.

The invention provides a range of apparatus for removing excess heat, and the preferred embodiments of these apparatus are illustrated in the accompanying FIGURES, for ease of explanation. Clearly, other apparatus that perform the same function, of removing excess heat, so that a smoother weld surface is produced at a faster rate, are also within the scope of the invention.

Figure 2:
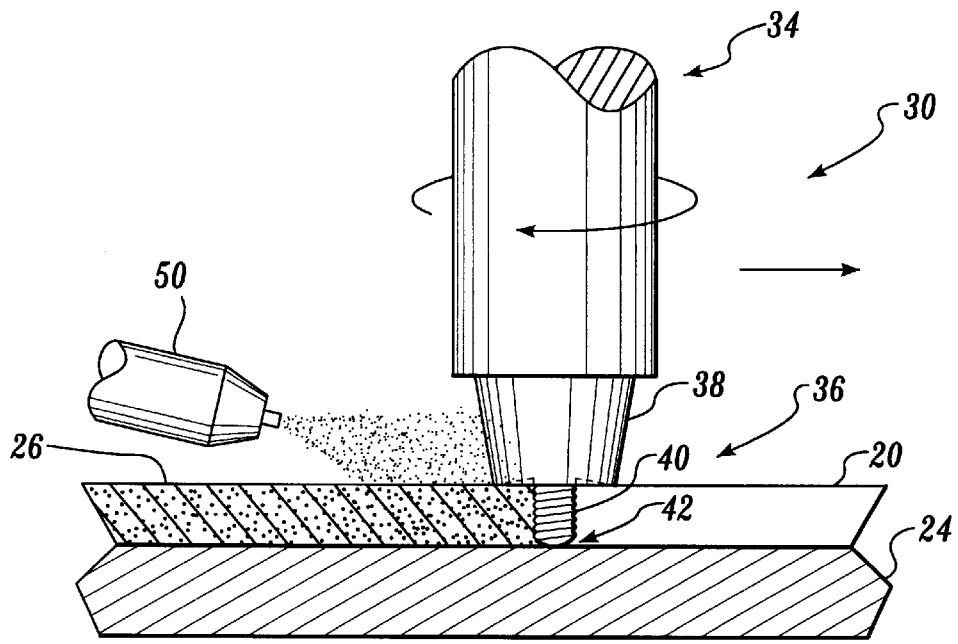
FIG. 2 illustrates a friction stir welding apparatus of the invention, including a nozzle for providing a coolant.

Referring to FIG. 2, a schematic side view of a preferred embodiment of an apparatus in accordance with the invention, a substantially cylindrical weld tool body 30 having a proximal end 34, for operative connection to a drive motor for rotating the tool, and a distal end 36, that is equipped with a shoulder 38 and a substantially cylindrical pin 40 extending axially downward through a center of the shoulder. As shown, the pin 40 has a tip 42 and an outer surface that is helically grooved. The shoulder 38 is usually slightly peaked upward, from its circular periphery to the pin 40 at its center, at an angle of about 10°.

In accordance with the invention, a nozzle 50 extends in proximity to the welding tool body 30, in particular to the distal end 36, when a workpiece 20 is being welded on a backing plate 24. The rotating cylindrical pin has a tip 42 at its distal end that extends through the workpiece 20 to a depth to provide a minimal clearance between it and the backing plate 24. Thus, the pin extends substantially through the entire thickness of the workpiece 20, to produce a continuous weld 26 through the entire workpiece. The nozzle is in fluid communication with a source of coolant, such as a liquid or air, that is supplied under pressure to the nozzle, so that coolant exits the nozzle in a mist that impinges directly on the distal end 36 of the tool, and the surrounding workpiece 20. Thus, the coolant removes excess heat from both the exposed portion of the shoulder 38 that is above the workpiece 20 during welding, the workpiece 20 itself, and the weld 26 that is being formed. Heat travels by conduction from the hot rotating pin 40 and the shoulder 38 to their surroundings, namely, the workpiece 20 and the weld 26, from which the coolant then removes the heat. As a result, the temperatures of the surface of the rotating shoulder 38 and workpiece are significantly lower than would have been the case, but for the supply of coolant. These reduced surface temperatures caused by removal of excess heat, as explained above, provide a smoother weld surface at a faster weld rate. The amount of coolant should be controlled to avoid removal of so much heat as to interfere with the welding operation. A coolant rate of about 0.01 gpm is usually suitable and the rate may readily be optimized for a specific application.

Figure 3:
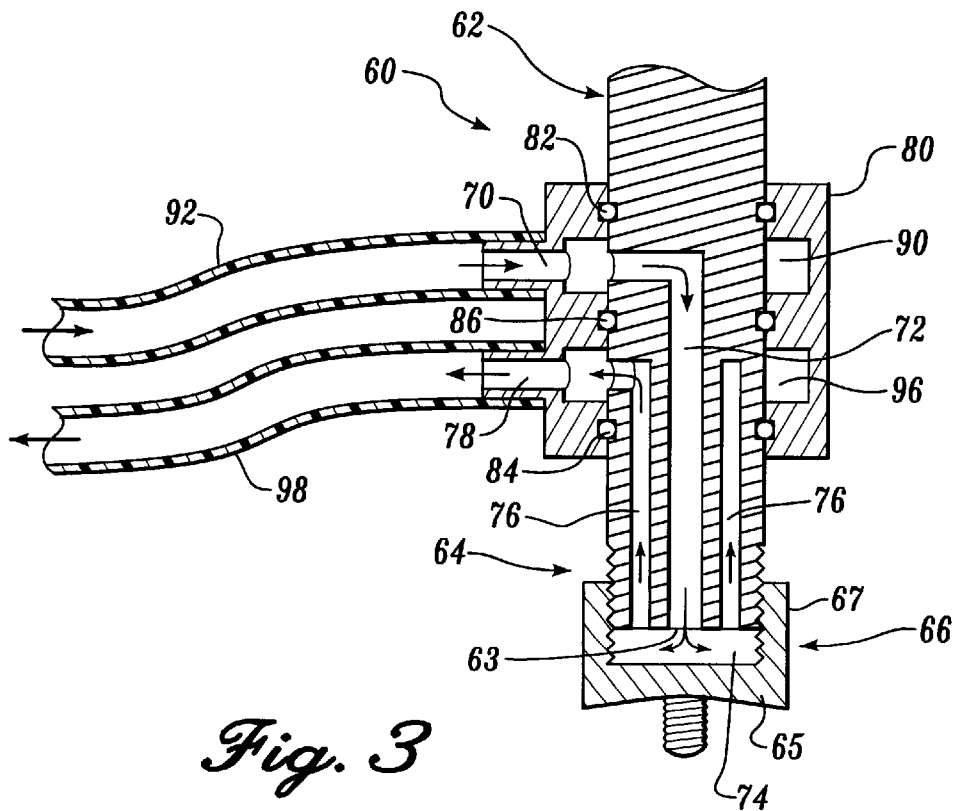
FIG. 3 is a schematic diagram, in cross-section, of an embodiment of an internally cooled welding tool of the invention.

FIG. 3 illustrates, schematically, in cross section, an internally cooled FSW tool in accordance with the invention. As shown, the substantially cylindrical tool body 60 has a proximal end 62 for coupling to a motor for rotating the tool, and a threaded distal end 64. A cap-shaped shoulder 66, with a circular shoulder base 65 and an internally threaded collar 67, is threadingly engaged to the distal end 64 of the FSW to produce an internal cylindrical space 74 between the base 63 of the tool body 60 and the base 65 of the shoulder. A pin, preferably with a helically grooved exterior, extends downward from the center of the base of the shoulder. The tool includes an internal space, preferably a serpentine or tortuous internal space, that is in fluid communication with a source of coolant, and a sink for receiving heated coolant. In the embodiment shown, the internal space is made up of vertical spaced and horizontal bores. Thus, a substantially horizontal inlet bore 70 penetrates to about the center of the distal end 64 of the cylindrical tool body 60. A central vertical bore 72 extends downward from the farthest extent of the horizontal bore 70 to exit from the base 63 of the distal end 64 of the tool body 60 so that it is in fluid communication with space 74. An annular space 76, concentric with the central bore 72, surrounds the central bore 72 and extends from the base 63 of the tool body 60 to below the inlet bore 70. Thus, the central bore 72 is in fluid communication with the annular space through internal space 74 at the very distal end 63 of the tool body 60. An exit bore 78 extends from an upper end of the annular space 76. Coolant fluid entering the inlet bore 70 flows down the central bore 72, into the internal cylindrical space 74, into the annular space 76 and out of the exit bore 78.

In order to direct the coolant, a cylindrical coolant collar 80, concentric with and spaced from the tool body 60, surrounds the inlet 70 and outlet 78 bores. The collar 80 is sealed against the body 60 of the tool with an upper O-ring seal 82 above the inlet bore 70, and is also sealed against the tool body with a lower O-ring seal 84 below the exit bore 78. In addition, the collar 80 is sealed to the tool body 60 by a third O-ring 86 located between the inlet 70 and outlet 78 bores. Thus, the collar 80 forms a separate inlet compartment 90 that is in fluid communication with the inlet bore 70, and an outlet compartment 96 that is in fluid communication with the outlet bore 78. A coolant inlet hose 92 is coupled to the inlet compartment 90 of the collar, and a coolant outlet hose 98 is coupled to the outlet compartment 96 of the collar 80.

Control of coolant flow is important to avoid overcooling of the tool thereby interfering with the welding process. A coolant rate of about 0.1 gallons per minute is suitable.

Figure 4:
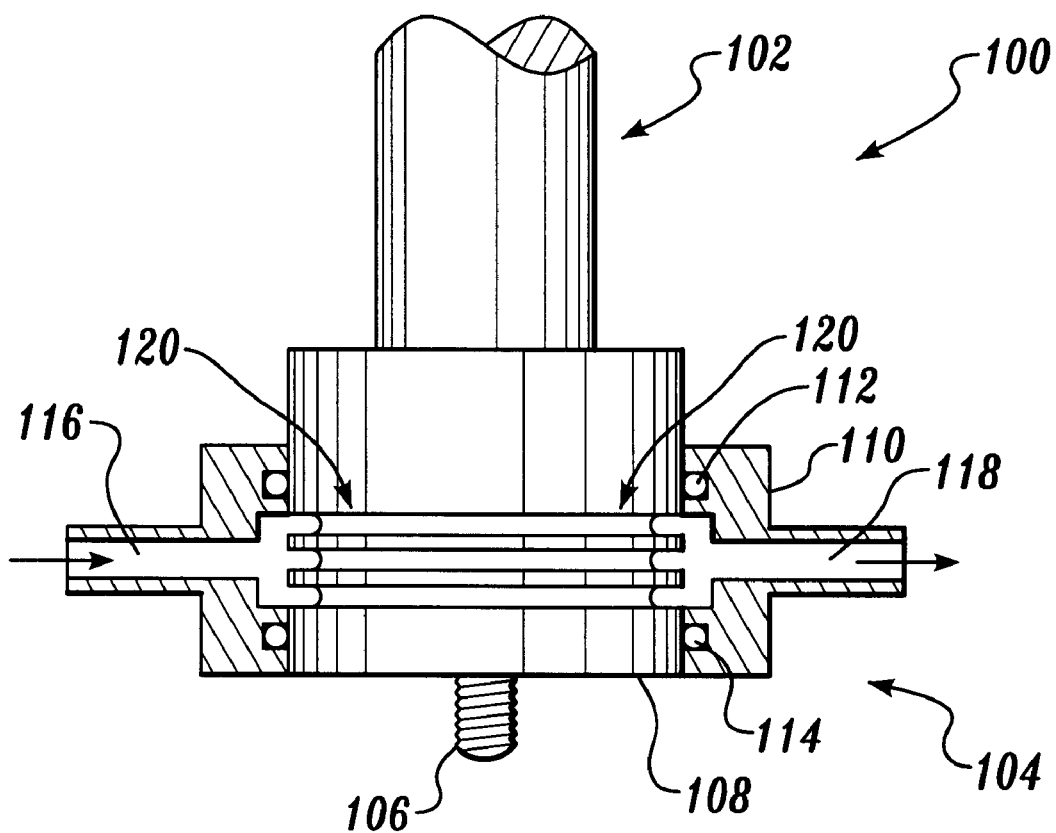
FIG. 4 is a schematic side view, in partial cross section, showing an externally jacketed embodiment of the tool of the invention.

An alternative embodiment, using an external cooling jacket, is illustrated schematically in FIG. 4. In this embodiment, the cylindrical welding tool body 100 has a proximal end 102 adapted for coupling to a means for rotating the tool, and a distal end 104 equipped with a central downwardly extending pin 106, surrounded by a shoulder 108. The substantially cylindrical distal end 104 of the tool body 100 is equipped with an external structure designed to dissipate heat, in this instance a series of circumferentially extending fins 120. The structure increases the surface area of the distal end, thereby permitting removal of larger amounts of heat for more effective cooling. A substantially cylindrical jacket 110 surrounds the finned distal end 104 of the tool 100, and is sealed against the tool body 100 by an upper O-ring 112, and a lower O-ring 114. Thus, the jacket 110 surrounds the fins 120, and is spaced from the fins to provide an annular region 122 that is in fluid communication with an inlet port 116 of the jacket, and an outlet port 118. In use, coolant fluid enters the inlet port 116, flows into the annular space and around the fins 120, and exits from the outlet port 118, removing heat from the surface of the tool 100. This removal of excess heat, that can be controlled by controlling the temperature of incoming coolant and its flow rate, allows the production of a weld of substantially uniform smoothness at a much faster rate, even when a high-strength aluminum alloy, such as aluminum 2024 or 7075, is being welded. As before, a coolant rate of about 0.1 gpm is usually suitable, and the rate may be readily optimized by experimentation for any specific application.

Figure 5:
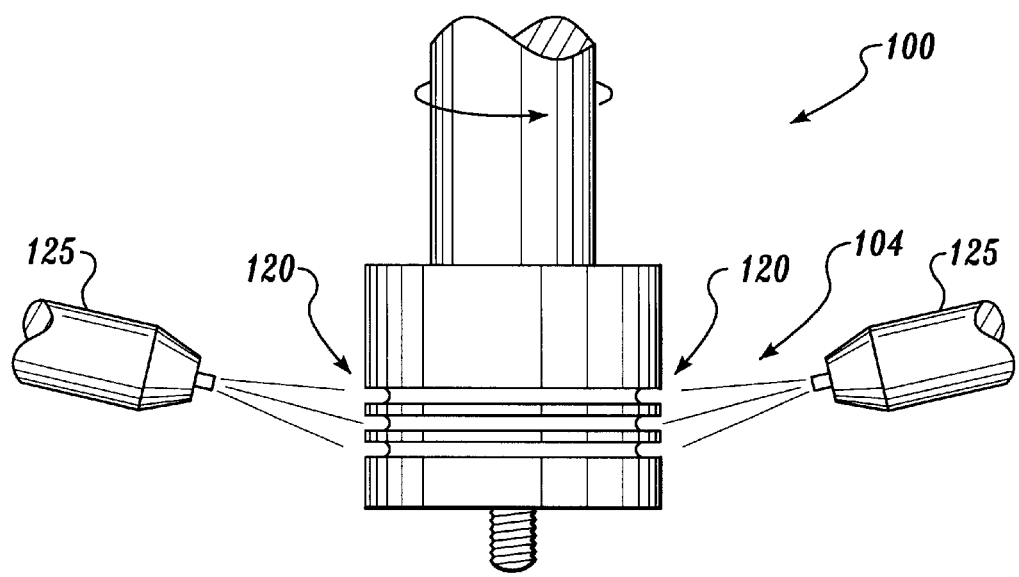
FIG. 5 is a schematic side view of an air cooled, finned embodiment of a tool of the invention.

In a yet further embodiment, illustrated schematically in FIG. 5, the welding tool is cooled by using cold air as a coolant. In this instance, as above, the welding tool 100 is equipped with a series of circumferentially extending cooling fins 120 on its distal end 104. However, instead of a surrounding jacket 110, at least one nozzle 125 is oriented to continuously blast cold air, or another cold gas, onto the fins 120 of the welding tool to provide cooling. As above, this removal of excess heat results in a cooler welding tool so that a weld with a uniform, smooth upper surface is produced, at a faster rate.

Figure 6A:
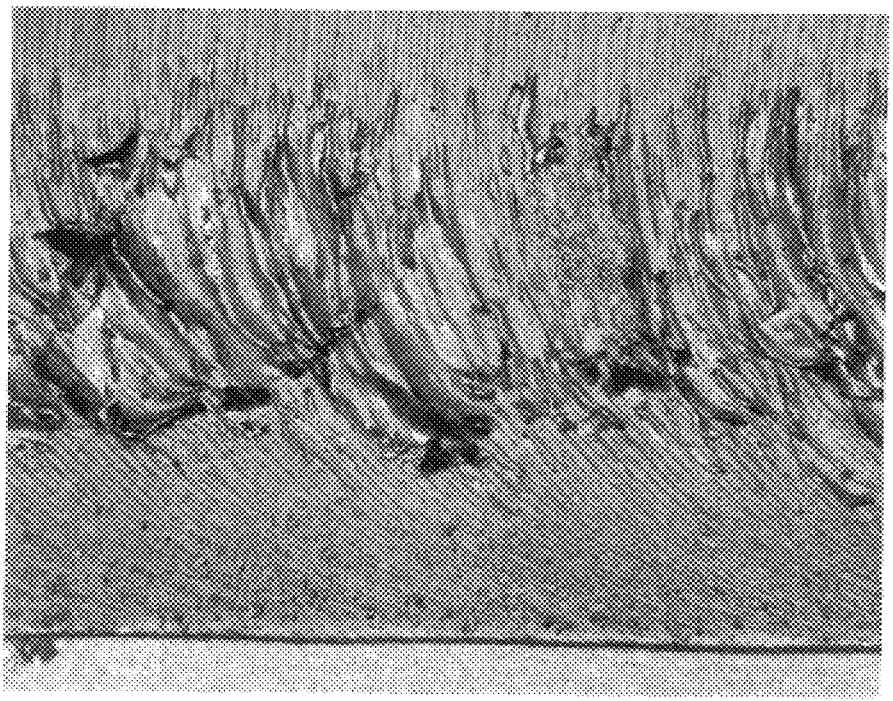
FIG. 6A is an optical micrograph showing details of the surface of a weld using a prior art friction stir welding tool.
Figure 6B:
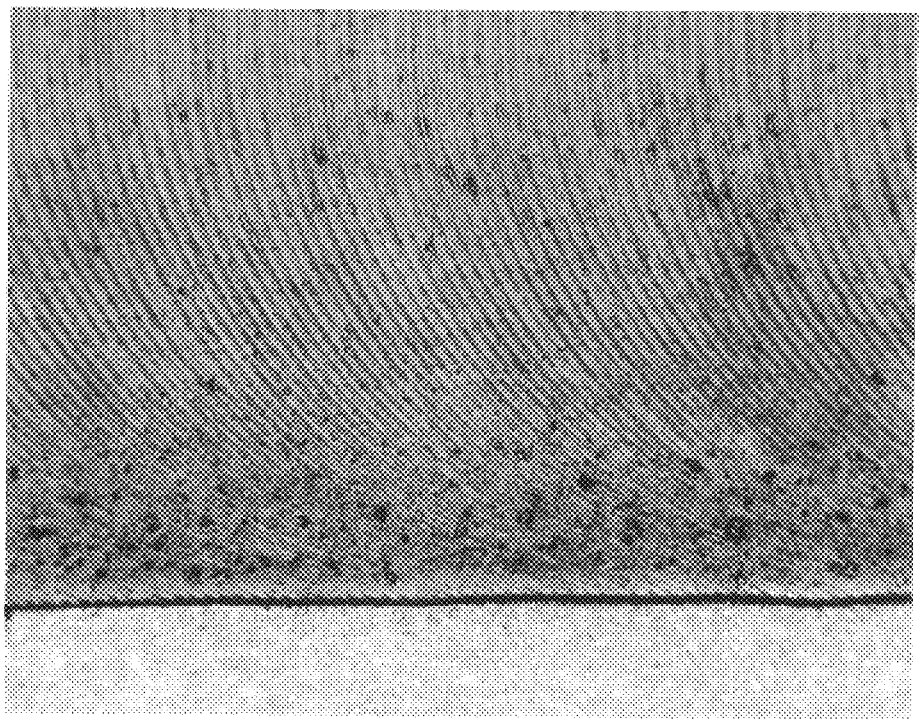
FIG. 6B is an optical micrograph of a surface of a weld made in accordance with the invention.

In accordance with the invention, a weld that is significantly smoother than achievable with prior art friction stir welding techniques and tools is produced. As can be seen from FIG. 6A, an optical micrograph of an aluminum alloy 2024 stir weld at magnification of eight times, a weld produced according to the prior art is rough, having open tears on its upper surface. The weld was produced at a FSW tool rotation speed of 640 rpm, and a weld rate of 6.3 inches per minute. Welds produced in accordance with the invention, exemplified by FIG. 6B, an optical micrograph at the same magnification for the same material, has a uniform, smooth surface, without surface tears. This weld was produced by a FSW tool rotating at 640 rpm and welding at a rate of 6.3 inches per minute. The weld surface shown in FIG. 6B was produced with an air/water mist applied at the junction between the tool shoulder and the weld surface, on the side opposite the direction of welding. It may be expected that this reduction in roughness will reduce the likelihood of fatigue crack initiation and surface corrosion and would therefore prolong the life (and safety) of welded parts. Also, it is expected that long welds could be performed without material buildup on the shoulder.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, any means-plus-function clauses are intended to cover the structures described herein as performing the recited function, and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may nevertheless be equivalent structures.

The embodiments of the invention in which an exclusive property or privilege is claimed are defined as follows:

1. A method of friction stir welding, the method comprising:
   (a) using a rotating friction stir welding tool to weld a workpiece comprised of a difficult to friction stir weld material, wherein the friction stir welding tool comprises a tool body having a pin and shoulder at a distal end, the pin and shoulder adapted for generating frictional heat when rotating in contact with parts to be welded together, the heat causing a weld to form between the parts, the friction stir welding tool further comprising an internal space defined within the body of the welding tool, the space in fluid communication with a source of coolant and walls of the space in heat conducting communciation with the distal end of the tool body; and
   (b) simultaneously cooling the distal end of the body by flowing coolant through the internal space during welding operations.

2. A method of friction stir welding a workpiece, the method comprising:
   (a) using a rotating friction stir welding tool to weld the workpiece, wherein the friction stir welding tool comprises a tool body having a pin and shoulder at a distal end, the pin and shoulder generating friction heat when rotating in contact with parts to be welded together, the heat causing a weld to form between the parts, the friction stir welding tool further comprising a coolant distribution device, in fluid communication with a source of coolant, the device aligned to direct coolant around the distal end of the tool body when the tool is used to weld; and
   (b) simultaneously removing excess heat from the rotating friction stir welding tool by using the coolant distribution device to direct coolant around the distal end of the tool body while friction stir welding the workpiece.

3. The method of claim 1, wherein the internal space is in fluid communication with a collar surrounding the tool body, the collar partitioned into the inlet and outlet sections, the inlet section of the collar in fluid communication with an inlet of the internal space, and the source of coolant.

4. The method of claim 1, wherein the coolant is supplied at a rate of about 0.1 gallons per minute.

5. The method of claim 1, wherein the distal end of the tool body is equipped with heat-dissipating fins.

6. The method of claim 2, wherein the coolant distribution device is a nozzle able to produce a mist of coolant therethrough.

7. The method of claim 2, wherein the coolant distribution device is a nozzle able to produce a blast of cold air therethrough.

8. The method of claim 2, wherein the coolant is supplied at a rate of about 0.01 gallons per minute.

9. The method of claim 2, wherein the distal end of the tool body is equipped with heat-dissipating fins.

10. In a method of friction stir welding, a friction stir welding tool comprises a tool body having a pin and shoulder at a distal end of the tool body, the pin and shoulder adapted for generating frictional heat when rotating in contact with a workpiece being welded, said heat causing a weld to form, the improvement comprising:
    a jacket surrounding the distal end of the tool body, the jacket having an inlet in fluid communication with a source of coolant, and an outlet for exit of heated coolant whereby, when coolant flows through the jacket during welding, excess heat is removed from the distal end of the tool body.

11. The method of claim 10, wherein the coolant is supplied at a rate of about 0.1 gallons per minute.

12. The method of claim 10, wherein the distal end of the tool body is equipped with heat-dissipating fins.

* * * * *

UNITED STATES PATENT AND TRADEMARK OFFICE
CERTIFICATE OF CORRECTION

PATENT NO. : 6,516,992 B1
DATED : February 11, 2003
INVENTOR(S) : K.J. Colligan

It is certified that error appears in the above-identified patent and that said Letters Patent is hereby corrected as shown below:

Title page,
Item [56], References Cited, U.S. PATENT DOCUMENTS, please insert in appropriate order:
-- 3,695,651    10/1972    Stuck
3,717,539    2/1973    Roberts
3,731,959    5/1973    Calton et al.
3,759,449    9/1973    Ruthman et al.
3,779,446    12/1973    Lemelson
4,106,167    8/1978    Luc
4,144,110    3/1979    Luc
4,990,206    2/1991    Garske et al.
5,116,172    5/1992    Koster
5,405,155    4/1995    Kanaan et al.
5,591,292    1/1997    Blomqvist
5,669,437    9/1997    Hernandez et al.
5,707,186    1/1998    Gobell et al.
5,922,941    7/1999    Winkler et al.
6,153,035    11/2000    Van Laeken --
Item [74], *Attorney, Agent, or Firm*, "Kindness PPLC" should read -- Kindness PLLC --

Column 7,
Line 27, "friction heat" should read -- frictional heat --

Column 8,
Line 3, "into the inlet" should read -- into inlet --

Signed and Sealed this

Ninth Day of September, 2003

JAMES E. ROGAN
*Director of the United States Patent and Trademark Office*